Feb. 26, 1963　　　A. F. FOOTE　　　3,078,930
IMPLEMENT LIFT FOR AUTOMOTIVE VEHICLE
Filed July 27, 1960　　　　　　　　3 Sheets-Sheet 1
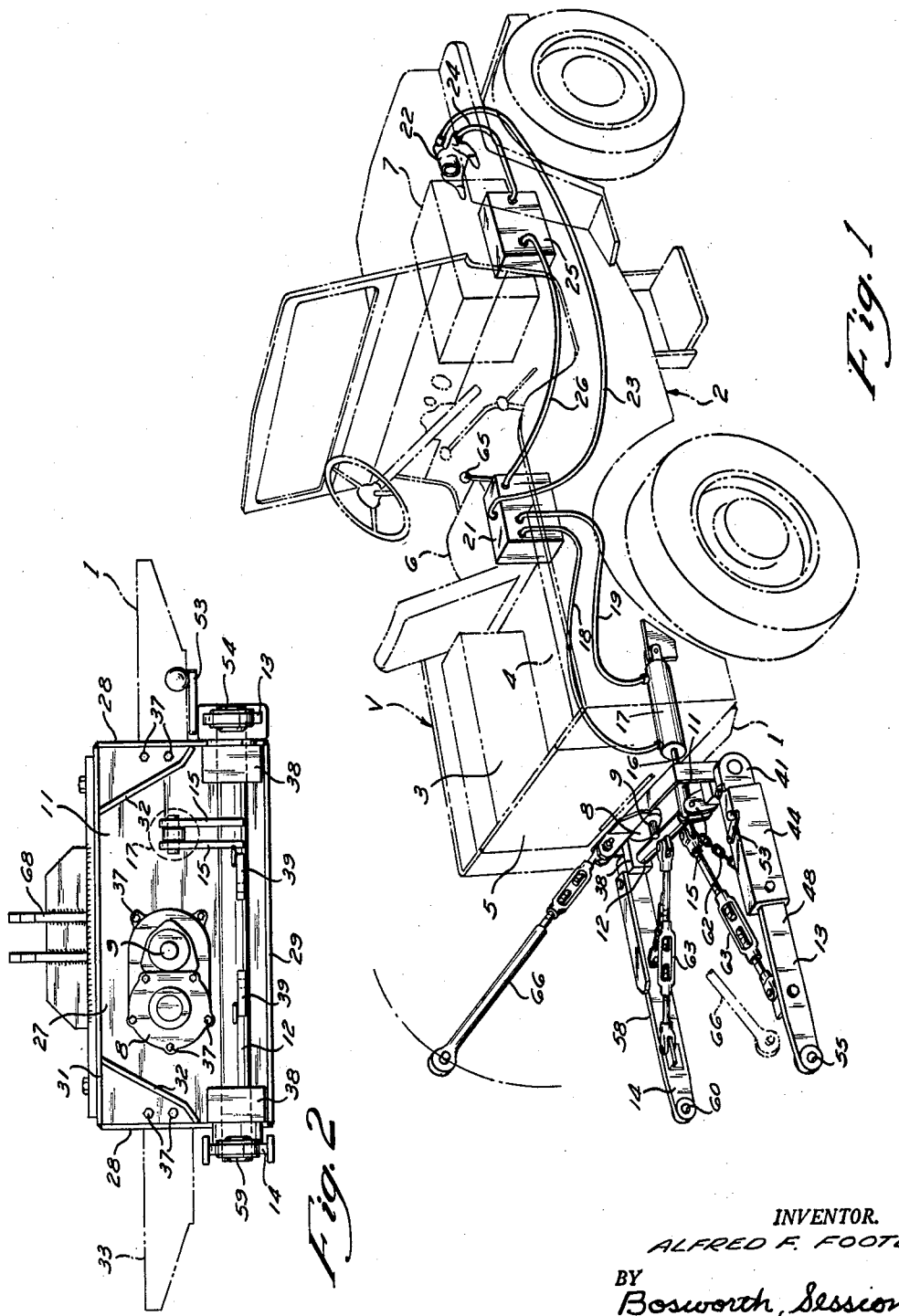
INVENTOR.
ALFRED F. FOOTE
BY
Bosworth, Sessions
Herrstrom & Knowles
ATTORNEYS Feb. 26, 1963  A. F. FOOTE  3,078,930
IMPLEMENT LIFT FOR AUTOMOTIVE VEHICLE
Filed July 27, 1960  3 Sheets-Sheet 2
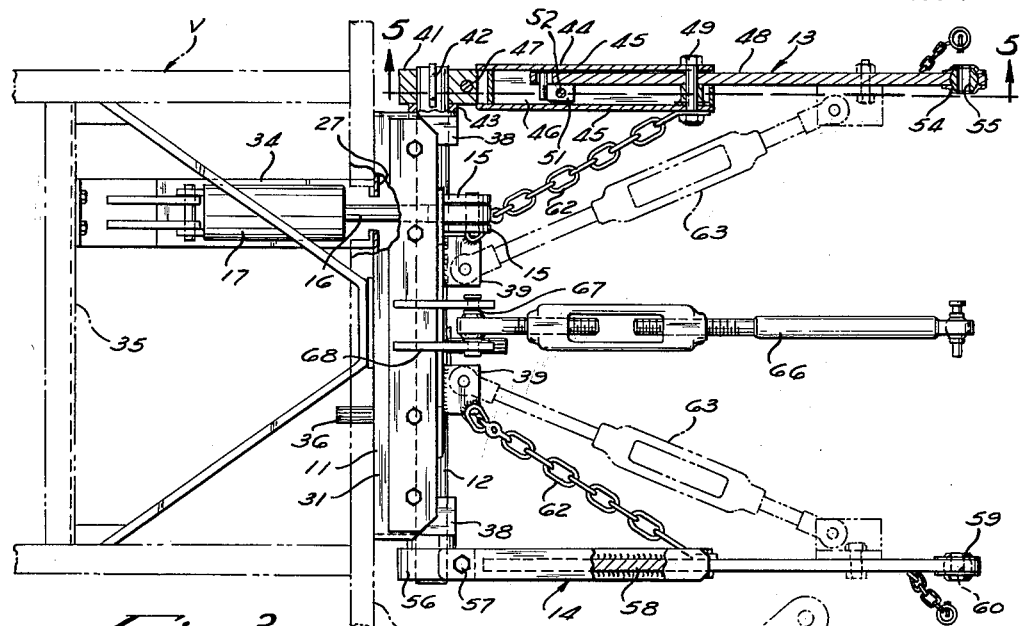
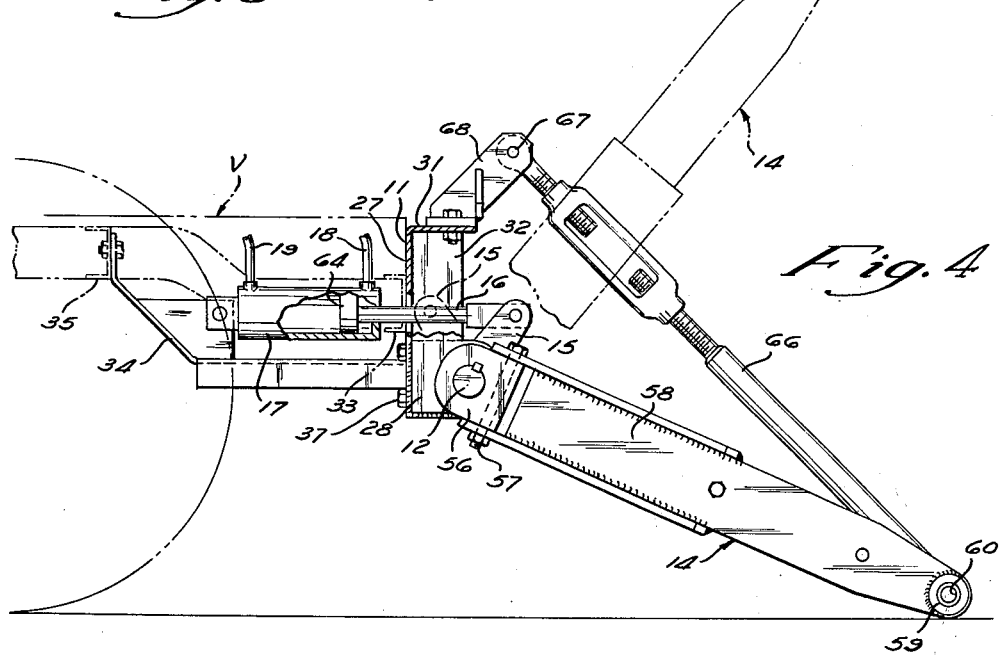
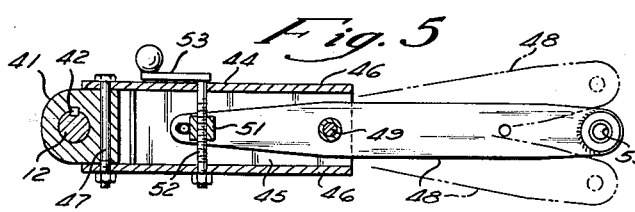
INVENTOR.
ALFRED F. FOOTE
BY Bosworth, Sessions
Henstrom & Knowles
ATTORNEYS Feb. 26, 1963 A. F. FOOTE 3,078,930
IMPLEMENT LIFT FOR AUTOMOTIVE VEHICLE
Filed July 27, 1960 3 Sheets-Sheet 3

INVENTOR.
ALFRED F. FOOTE
BY
Bosworth, Sessions
Herrstrom & Knowles
ATTORNEYS

United States Patent Office 3,078,930
Patented Feb. 26, 1963

3,078,930
IMPLEMENT LIFT FOR AUTOMOTIVE VEHICLE
Alfred F. Foote, Elyria, Ohio, assignor to Stratton Equipment Company, Cleveland, Ohio, a corporation of Ohio
Filed July 27, 1960, Ser. No. 45,615
2 Claims. (Cl. 172—491)

This invention relates to lifting devices for implements, and more particularly to a hydraulic lift adapted to be attached to an automotive vehicle for the purpose of connecting, raising, or lowering implements which are operable by the vehicle.

Although the invention may be advantageously employed on various types of automotive vehicles, for convenience it will be discussed and illustrated as used on a lightweight utility type automotive vehicle of the type sold under the trademark "Jeep" having at the rear of its body an open-topped cargo-carrying portion, preferably equipped with an end gate and with a power takeoff mechanism located at the rear of the vehicle below the floor of the body.

For most effective use of both the lift and the vehicle to which the lift is attached, the lift should satisfy several conditions. It should be capable of easy installation on the automotive vehicle with little or no change to the vehicle. After installation, it should not interfere with the normal usage of the vehicle for cargo carrying and should not impair the road clearance of the vehicle; it should not prevent access to or impede operation of the power takeoff, so that the power takeoff can be used for operation of implements attached to the lift or for other purposes not related to the lift. The lift arms should be readily removably, without requiring removal of the remainder of the lift mechanism, when the vehicle is to be used for purposes in which the projecting arms might be undesirable. Furthermore, the lift should be easily operated by simple control means which will permit its arms to be lowered and held in a lowered position, raised and held in the raised position, or put in a float condition where the arms are not operated by the power system to permit certain implements attached to the lift to follow the ground contour.

The lift should make possible the attachment of conventional implements requiring two or three point connections; for this and other reasons the arms of the lift should be laterally movable toward and away from each other, and should also be adjustable so that their ends or connecting terminals may be relatively offset horizontally, to permit most effective use of certain implements, such as plows. It should also be possible when necessary rigidly to secure the arms transversely relatively to each other, and also in a vertical direction relatively to the vehicle frame.

Prior lifts for such vehicles fail to provide many of these features. Most commonly, their design is such that the lift actuating mechanism occupies a considerable amount of space in, or otherwise obstructs, the cargo carrying portion of the vehicle, and usually prevents use of the end gate. Such prior lifts also usually impair access to or operation of the power takeoff. They are usually difficult to install and require extensive modification of the vehicle. Often they do not provide the necessary adjustability of the connecting terminals by which the lift may be connected to the implement to permit the desired operation.

Because of difficulty of installing and removing even parts of prior lifts, as well as the obstruction by such lifts of the cargo carrying space and power takeoff, prior lifts when installed often impair use of the vehicle for ordinary purposes, and if removed prevent emergency use of the vehicle for purposes requiring use of the lift. Consequently, full usage of the vehicle and the lift usually is not possible with prior devices.

It is a general object of this invention to provide a lift which satisfies all of the above indicated desirable conditions and overcomes the above and other disadvantages of prior lifts. Another object is the provision of a lift which may be readily attached to the rear end of a vehicle with little modification of the vehicle. A further object is the provision of a lift which when attached to the rear end of a vehicle has its supporting and actuating means located below the cargo carrying portion of the body to permit full utilization of the body for cargo carrying. A further object is the provision of a lift which does not interfere with access to or operation of a power takeoff at the rear of the vehicle. Another object is to provide such a lift which is simple and effective in operation and which may be manufactured and installed at a reasonable cost. Further objects and advantages of the invention will become apparent from the following description of a preferred form thereof, reference being made to the accompanying drawings. The essential characteristics of the invention are summarized in the appended claims.

In the drawings:

FIGURE 1 shows a lift embodying the invention as applied to the vehicle of the type described above, the vehicle being shown in broken lines;

FIGURE 2 is an end elevation of the lift;

FIGURE 3 is a plan elevation of such lift, parts of the lift being broken away more clearly to show the adjustable arm.

FIGURE 4 is a side elevation of the lift;

FIGURE 5 is a sectional elevation, along line 5—5 of FIGURE 3, of one of the lift arms designed so that the end of the arm is vertically adjustable with respect to the remainder of the arm;

Figure 6:
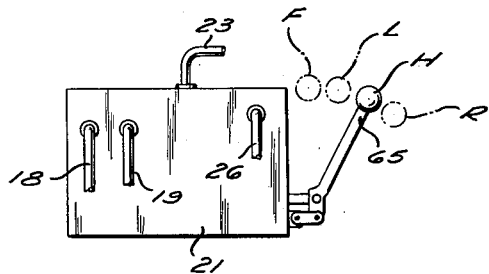
FIGURE 6 is a somewhat diagrammatic view of the means for controlling the lift.

In the drawings, the lift of the invention is shown as installed on a conventional utility type motor vehicle, shown in broken lines and generally indicated by the letter V. The motor vehicle has a chassis frame 1 on which is mounted a body 2 having at the rear a cargo carrying portion 3 with a floor 4 and an end gate 5. The body also includes a driver's seat 6 and the conventional controls. The illustrated vehicle also has a motor 7 near its front end, and a power takeoff mechanism 8, having a driven power shaft 9, fixed to the rear of its chassis frame under the cargo portion 3 and adapted to be driven when desired by suitable conventional means not shown.

The lift mechanism of the invention, which is shown in full lines in the drawings, comprises a transversely extending supporting member 11 which is rigidly fixed to the rear of the chassis frame of the vehicle at a level below the floor 4 (see FIGURE 4), and rotatably supports a transversely extending shaft 12 to the ends of which are rigidly fixed the lifting arms 13 and 14. Shaft 12 also has rigidly fixed to it spaced crank arms 15 pivotally connected to an end of a piston rod 16 of a hydraulic cylinder 17. This cylinder, the piston of which is adapted to be positively driven in each direction by hydraulic pressure, is connected through suitable conduits 18 and 19 to a control device 21 for the lift. This control device, which is preferably located as shown adjacent the driver's seat 6, is of a conventional commercially available type;

it is connected to a suitable hydraulic pump 22, of conventional design, which is mounted at and driven from the front end of the motor 7 of the vehicle. The output or high pressure side of the pump is connected by conduit 23 to the control device 21; the intake or low pressure side of the pump is connected by a conduit 24 to a sump tank 25 which is connected by a conduit 26 to the control device 21, thus completing the hydraulic circuit.

The supporting member 11, as shown in FIGURES 2, 3 and 4, comprises a vertical rear plate 27, side and bottom flanges 28 and 29, top flange 31 and diagonal flanges 32 connected between the top and side flanges, all of which are welded together to provide an extremely strong and rigid member 11. As shown in FIGURES 3 and 4, supporting member 11 is bolted to the rear cross member 33 of the chassis frame 1 of the vehicle and is also braced by auxiliary frame member 34 bolted to the rear side of plate 27 of member 11 and to intermediate cross member 35 of the chassis frame. Member 11 has suitable apertures in its rear plate 27 to permit through passage of the piston rod 16 of the cylinder 17, the drive shaft 36 for the power takeoff 8, and the bolts 37 by which the member 11 and power takeoff are supported.

Near its ends, supporting member 11 also rigidly carries a pair of bearing members 38; these bearing members rotatably support the actuating shaft 12 for the lifting arms 13 and 14 so that the axis of its shaft extends substantially horizontally and transversely of the vehicle, below the floor 4 of the body and below the power takeoff mechanism 8. Intermediate its ends, shaft 12 has rigidly welded to it the spaced crank arms 15 which are connected to the end of piston rod 16, and two spaced lugs 39 adapted to be connected to suitable restraining means for the arms such as those later described.

As shown in FIGURES 3 and 5, the arm 13, the end of which is adjustable laterally and transversely relatively to the shaft 12, comprises a base member 41 which is rigidly fixed to one of the projecting ends of the shaft by a key 42 and is spaced from its associated bearing member 38 by suitable member 43. An intermediate arm member 44 is pivotally mounted on base member 41 for movement in a plane paralleling the axis of shaft 12; it comprises side members 45 rigidly fixed to top and bottom members 46 which are pivotally mounted on base member 41 by a bolt 47 mounted with its axis normal to the axis of shaft 12. An end arm member 48, which is also included in arm 13, is pivotally mounted on a bolt 49 between the side members 45 of intermediate member 44, so that the end member 48 can adjustably pivotally move in directions transversely to the axis of shaft 12. Such movement and the position of member 48 are controlled by an internally threaded member 51 mounted for pivotal and limited slidable movement on the inner end of member 48 and engaging the threads of a screw member 52 rotatably mounted in the top and bottom members 46 of intermediate arm members 44 and adapted to be manually turned by means of an adjusting crank arm 53. Preferably, the outer end of the arm member 48 of arm 13 carries a ball and socket terminal member 54 providing a wide range of angular positions of an opening 55 through it. The end of arm 13 carrying terminal member 54 thus is adjustable transversely relatively to the shaft 12 by crank member 52, and is also pivotally movable relatively to the shaft in a plane parallel to the axis of the shaft.

Although the other arm 14 could be of similar design, in the illustrated apparatus it comprises a base member 56 similar to base member 41 of arm 13 rigidly mounted in the same manner on the opposite end of shaft 12. This member pivotally supports, by bolts 57, a rigid arm member 58 having at its outer end a ball and socket terminal member 59 containing an aperture 60 which may be disposed in a wide variety of angular positions. The end of arm 14 carrying terminal member 59, therefore, is pivotally movable relatively to the shaft 12 in a plane parallel to the axis of the shaft, but is not adjustable transversely relatively to the shaft, as is arm 13. Preferably, the arms 13 and 14 are connected by flexible restraining means such as chains 62 to lugs 39 on the shaft 12, so that the arms can move inwardly toward each other but are limited in outward movement away from each other. If desired, rigid restraining means may also be employed between each of lugs 39 and each arm to prevent any movement of the arms toward or away from each other; in the illustrated embodiment rigid bars 63, adjustable as to length, are provided for this purpose as optional equipment.

The actuating hydraulic cylinder 17, which is of conventional design is pivotally mounted on the auxiliary frame member 34; it comprises a piston 64, one side of which is exposed to fluid from conduit 18 and the other side of which is exposed to fluid from conduit 19.

The illustrated control device 21 of a known type has a control handle 65 which may be moved to four operating positions, indicated as R, H, L, and F in FIGURE 6. When the handle 65 is moved forward to position R, the control device 21 allows fluid at high pressure from the pump 22 to flow through conduit 18 into the cylinder 17, causing its piston 64 to move to the left in FIGURE 4 and thus turn the shaft 12 to raise arms 13 and 14; when the handle 65 is moved to the rear to position L, the control device 21 causes the fluid at high pressure from pump 22 to flow through conduit 19 to move the piston 64 of the cylinder 17 to the right in FIGURE 4, thus turning shaft 12 to lower the arms 13 and 14, as shown in such figure. When the handle 65 is moved to position H between positions R and L, the valve device 21 causes high pressure fluid to flow through both conduits 18 and 19 to both sides of piston 64 to restrain it against movement in either direction, thus holding the arms 13 and 14 in the positions in which they were located when the handle 65 was moved to position H. Furthermore, when the control handle 65 is moved to position F, the control device 21 cuts off the high pressure fluid from both sides of the piston 64 in cylinder 17, so that the piston can freely move in either direction in the cylinder and an implement such as a plow connected to the arms 13 and 14 is free to follow the contour of the ground.

Figure 7:
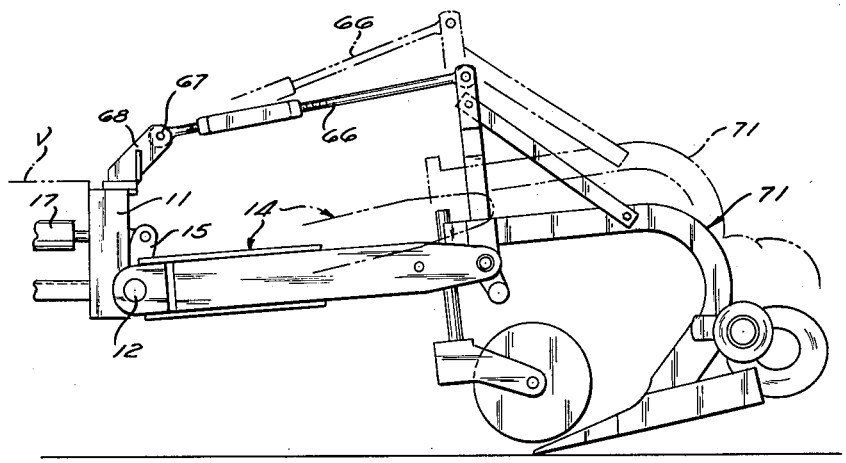
FIGURE 7 shows a portion of the vehicle with the lift in place and attached by a three point suspension to a plow.

Preferably, the lift also includes a central connecting bar 66 pivotally mounted centrally of the upper portion of supporting member 11, as by pivot bolt 67 connected to bracket 68 bolted to the top of supporting member 11. The length of connecting bar 66 preferably is adjustable, to permit a variety of devices to be connected to the lift by a three-point connection, such as the plow generally indicated by reference numeral 71 in FIGURE 7 and the post hole digger generally referred to by numeral 72 in FIGURE 8. In FIGURE 7 the plow 71 is shown in full lines ready for operation, and in broken lines as lifted above the ground. The connecting bar 66 and the ball and socket terminal members 54 and 59 at the ends of the arms 13 and 14 support the plow for most effective operation.

Figure 8:
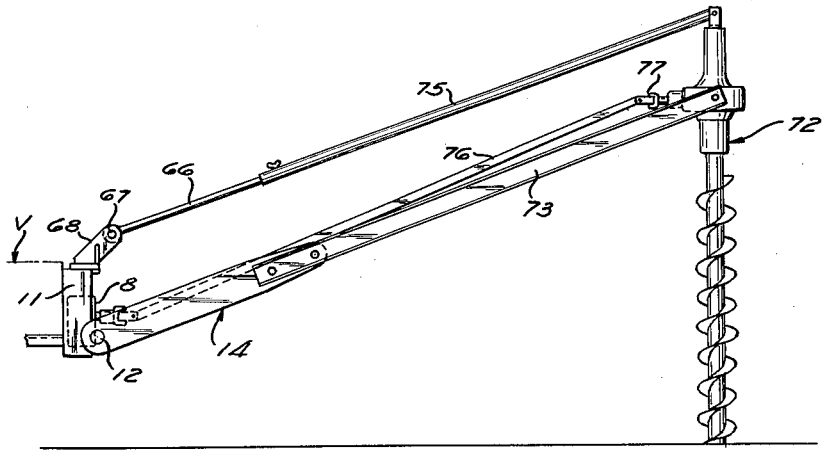
FIGURE 8 shows the lift as attached to a vehicle and used in association with the power takeoff for supporting and driving a post hole digger.

In the apparatus shown in FIGURE 8, extension arms 73 are bolted to the ends of the lifting arms 13 and 14, which are designed so such extension arms can be added. An extension member 75 is also rigidly connected to the end of connecting bar 66. The post hole digger 72 is pivotally mounted on the ends of the extension arms 73, and is located and guided vertically by such arms and by the length of the extended connecting bar made up of the members 66 and 75. The digger 72 is driven from the power takeoff 8 of the vehicle V by a drive shaft extension 76 including universal joint 77.

The arms 13 and 14 may be readily detached from the vehicle by removal of their pivot bolts 47 and 57, and the connecting bar 66 may also be readily detached by removal of its pivot bolt 67 and if desired its bracket 68. The remaining parts of the lift do not obstruct the rear of the vehicle, since they are disposed below the end gate portion; consequently, the vehicle may be used for all ordinary purposes after the arms and connecting bar have been removed, and for substantially all purposes even if these parts are not removed.

The present invention thus provides a lift for motor vehicles which may be easily installed, and after installation need not interfere with the ordinary operation of the vehicle. Since all portions of the lift except the removable bracket 68 supporting the bar 66 are located below the floor of the vehicle, and no parts except the removable arms 13 and 14 and bar 66 extend substantially beyond the rear of the vehicle, the lift illustrated as embodying the invention does not obstruct any cargo space or the power take-off. It also provides ample road clearance and satisfies all of the previously described conditions, while overcoming the deficiencies of prior lifts. Moreover it is simple and effective in operation, strong and durable in construction, and may be manufactured and installed at reasonable cost.

Those skilled in the art will appreciate that various changes and modifications can be made in the preferred form of apparatus described herein without departing from the spirit and the scope of the invention.

I claim:

1. A lifting device for attachment to a motor vehicle having at its rear portion a floor and a frame comprising frame members extending longitudinally of the vehicle below the floor and a transverse frame member fixed to and extending below said floor at the ends of said longitudinally extending frame members, said implement lifting device comprising a rigid supporting member located below the level of said floor and rigidly attached to said transversely extending frame member; an auxiliary frame extending longitudinally below said vehicle floor and rigidly connected to said supporting member and to said vehicle frame at a location spaced longitudinally from said supporting member in the direction toward the front of said vehicle; a rock shaft rotatably mounted on said supporting member, said shaft being located transversely of said vehicle and below the level of the floor thereof; spaced lifting arms mounted on said shaft to rotate positively therewith in either direction; crank arm means fixed to said shaft between said spaced lifting arms and extending upwardly from said shaft with the upper end of said crank arm means below the level of said floor; power means for exerting a tension force mounted below said floor on said auxiliary frame and at the side of said supporting means facing toward the front of said vehicle; and a tension member connecting said power means and the upper portion of said crank arm means, said tension member extending through said supporting member and said transverse member of said vehicle on which said supporting member is mounted.

2. A lifting device for attachment to a motor vehicle having at its rear portion a floor and a frame comprising frame members extending longitudinally of the vehicle below the floor and a transverse frame member fixed to and extending below said floor at the ends of said longitudinally extending frame members, said implement lifting device comprising a rigid supporting member of substantial depth located below the level of said floor and rigidly attached to said transversely extending frame member; an auxiliary frame extending below said vehicle floor and rigidly connected to the lower portion of said supporting member and to said vehicle frame at a position spaced longitudinally away from said supporting member in the direction toward the front of said vehicle; a rock shaft rotatably mounted on said supporting member, said shaft being located transversely of said vehicle and below the level of the floor thereof; spaced lifting arms mounted on said shaft to rotate positively therewith in either direction; crank arm means fixed to said shaft between said spaced lever arms and extending upwardly from said shaft with the upward end of said crank arm means below the level of said vehicle floor; a fluid actuated cylinder mounted below said vehicle floor on said auxiliary frame and at the side of said supporting member facing toward the front of said vehicle, said fluid actuated cylinder being located above said auxiliary frame and above the bottom edge of said supporting member; and a piston rod slidably mounted in said cylinder and connected to said crank arm means at a fixed location thereon above said rock shaft, said piston rod extending through said supporting member and through the transverse frame member of said vehicle.

References Cited in the file of this patent

UNITED STATES PATENTS

| | | |
|---|---|---|
| 2,414,072 | Taft | Jan. 7, 1947 |
| 2,441,798 | Crump | May 18, 1948 |
| 2,445,145 | Love | July 13, 1948 |
| 2,667,745 | Smith et al. | Feb. 2, 1954 |
| 2,673,508 | Richey | Mar. 30, 1954 |